United States Patent
Hatazawa et al.

(10) Patent No.: US 6,316,140 B1
(45) Date of Patent: Nov. 13, 2001

(54) NONAQUEOUS-ELECTROLYTE SECONDARY BATTERY WITH A CASE HAVING HEAT-WELDED PORTIONS

(75) Inventors: Tsuyonobu Hatazawa; Kazuhito Hatsuta; Tomitara Hara, all of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/421,940

(22) Filed: Oct. 21, 1999

(30) Foreign Application Priority Data

Oct. 23, 1998 (JP) .................................................. 10-303086

(51) Int. Cl.[7] .............................. H01M 2/06; H01M 2/08; H01M 10/40
(52) U.S. Cl. ...................... 429/163; 429/184; 429/231.95
(58) Field of Search ..................................... 429/127, 163, 429/162, 211, 231.95, 178–181, 184, 185

(56) References Cited

FOREIGN PATENT DOCUMENTS

| | | |
|---|---|---|
| 0 852 404 A1 | 7/1998 | (EP) . |
| 0 862 227 A1 | 9/1998 | (EP) . |
| 0 938 145 A2 | 8/1999 | (EP) . |
| 1-124953-A | * 5/1989 | (JP) . |
| WO97/24771 | 7/1997 | (WO) . |

* cited by examiner

Primary Examiner—Carol Chaney
Assistant Examiner—Susy Tsang
(74) Attorney, Agent, or Firm—Bell, Boyd & Lloyd LLC

(57) ABSTRACT

A nonaqueous-electrolyte secondary battery is disclosed which is capable of maintaining satisfactory adhesiveness of leads of terminals of electrodes in heat-welded portions of a case of the nonaqueous-electrolyte secondary battery without deterioration of the moistureproofing characteristics. A battery element is accommodated in a case constituted by laminated film such that the battery element is encapsulated by heat welding. Leads of terminals of electrodes electrically connected with the electrodes which constitute the battery element are exposed to the outside portion of the nonaqueous-electrolyte secondary battery through heat-welded portions. Portions of the leads of the terminals of the electrodes corresponding to the heat-welded portions are coated with an olefine adhesive layer containing a titanate coupling material and a coating layer made of resin which is the same as resin which forms the innermost layer of each of the laminated films.

11 Claims, 2 Drawing Sheets

NONAQUEOUS-ELECTROLYTE SECONDARY BATTERY WITH A CASE HAVING HEAT-WELDED PORTIONS

RELATED APPLICATION DATA

The present application claims priority to Japanese Application No. P10-303086 filed Oct. 23, 1998 which application is incorporated herein by reference to the extent permitted by law.

BACKGROUND OF THE INVENTION

1. Field of the Invention

The present invention relates to a nonaqueous-electrolyte secondary battery incorporating a battery device accommodated in a case constituted by a laminated film, and more particularly to an improvement in a portion for heat-welding leads of terminals of electrodes and the case of the battery to each other.

2. Description of the Related Art

In recent year, a variety of portable electronic apparatuses including a camcorder, a portable telephone and a portable computer have been marketed. Under the foregoing circumstances, reduction in the size and weight of the foregoing electronic apparatuses has been attempted. As a portable power source for the electronic apparatus, a battery, in particular, a secondary battery, and more particularly, nonaqueous-electrolyte secondary battery (a so-called lithium ion battery) have energetically been researched and developed to realize a battery which has a small thickness and which can be folded.

As an electrolyte of the shape variable battery, research and development of solidified electrolytic solution have energetically been performed. In particular, a solid polymer electrolyte having a structure that lithium salt is dissolved in a gel electrolyte which is a solid electrolyte containing a plasticizer has attracted attention.

On the other hand, research and development have been performed about a variety of batteries of a type which is encapsulated in laminated films obtained by bonding plastic films or a plastic film and a metal member to each other to use the advantages of the battery of the foregoing type that the thickness and weight can be reduced. It is an important fact for a battery of the foregoing type to realize reliable sealing characteristic as well as or better than that of a metal tube.

To meet the foregoing requirement, an attempt has been suggested in, for example, Japanese Patent Laid-Open No. 56-71278. According to the disclosure, leads coated with resin are used to draw out terminals of electrodes from a sheet member which encapsulates a battery so as to improve sealing characteristics.

In Japanese Patent Laid-Open No. 3-62447, an attempt has been suggested to improve the sealing characteristics by using polyethylene denatured with acrylic acid or polypropylene denatured with acrylic acid as the resin employed to form the seal portion of the encapsulating member.

Another attempt has been suggested in, for example, Japanese Patent Laid-Open No. 9-288998. According to the disclosure, leads coated with polyolefine resin denatured with maleic acid are used to draw out terminals of electrodes from a sheet shape member which encapsulates a battery. Also the sealing portion of the sheet shape member for encapsulating the battery is made of polyolefine resin denatured with maleic acid. Thus, the sealing characteristic can be improved.

The method disclosed in Japanese Patent Laid-Open No. 56-71278 having the structure that the member for encapsulating the battery is made of one type of the resin, however, encounters inward penetration of water through the resin. What is worse, penetration and volatilization of the electrolytic solution cannot be prevented. Therefore, the foregoing method cannot preferably be applied to a battery which uses a solid electrolyte composed of organic solvent.

The methods disclosed in Japanese Patent Laid-Open No. 3-62447 and Japanese Patent Laid-Open No. 9-288998 has a structure that the overall polarity of the resin is raised to improve the sealing characteristics with the terminals of the electrodes made of metal. Therefore, the affinity with water is undesirably enhanced in spite of improvement in the sealing characteristics. As a result, there arises a problem in that water is undesirably introduced in the long term.

SUMMARY OF THE INVENTION

In view of the foregoing, an object of the present invention is to sufficiently maintain the sealing characteristics of leads of terminals of electrodes in the heat welding portion of the case without deterioration in the resistance against moisture penetration. Another object of the present invention to provide a nonaqueous-electrolyte secondary battery exhibiting excellent moisture resistance and long lifetime against charge-discharge cycles.

To achieve the foregoing objects according to one aspect of the present invention, there is provided a nonaqueous-electrolyte secondary battery comprising: a case constituted by laminated film: a battery element accommodated in the case and encapsulated in the case by heat welding,g and leads of terminals of electrodes electrically conducted with the electrodes which are exposed to the outside portion of the case such that the leads are surrounded by heat-welded portions, wherein a portion of at least either of the leads of the terminals of the electrodes corresponding to the heat-welded portion is coated with an olefine adhesive layer containing a titanate coupling material and a coating layer made of resin which is the same as resin which forms the inner most layer of each of the laminated films. The term "olefine" as used throughout the text of the specification means the same as and is interchangeable with the term "olefin".

As described above, the portions of the leads of the terminals of the electrodes corresponding to the heat-welded portions are coated with the olefine adhesive layer containing the titanate coupling material. Thus, the adhesiveness of the metal leads of the terminals of the electrodes with respect to the resin can considerably be improved.

The refine adhesive layer is provided for only the portions corresponding to the leads of the terminals of the electrodes. Therefore, enhancement of the affinity with respect to water occurs in very small regions. Hence it follows that introduction of water can substantially be prevented.

As described above, the olefine adhesive layer is coated with the coating layer made of the resin which is the same as the resin which forms the innermost layer of each of the laminated films. The coating layer can be integrated with the case so that the adhesiveness is furthermore improved. Moreover, the olefine adhesive layer is coated with the foregoing coating layer so that introduction of water from the foregoing portion is satisfactorily prevented.

Other objects, features and advantages of the invention will be evident from the following detailed description of the preferred embodiments described in conjunction with the attached drawings.

DESCRIPTION OF THE PREFERRED EMBODIMENTS

The structure of a nonaqueous-electrolyte secondary battery according to the present invention will now be described with reference to the drawings.

Figure 1:
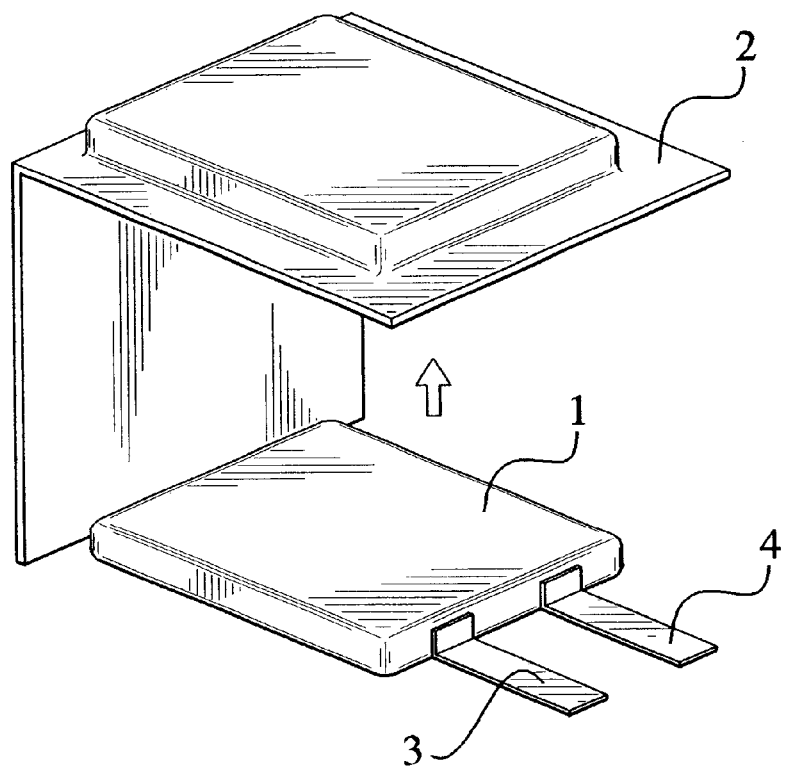
FIG. 1 is an exploded perspective view showing an example of the structure of a nonaqueous-electrolyte secondary battery according to the present invention.
Figure 2:
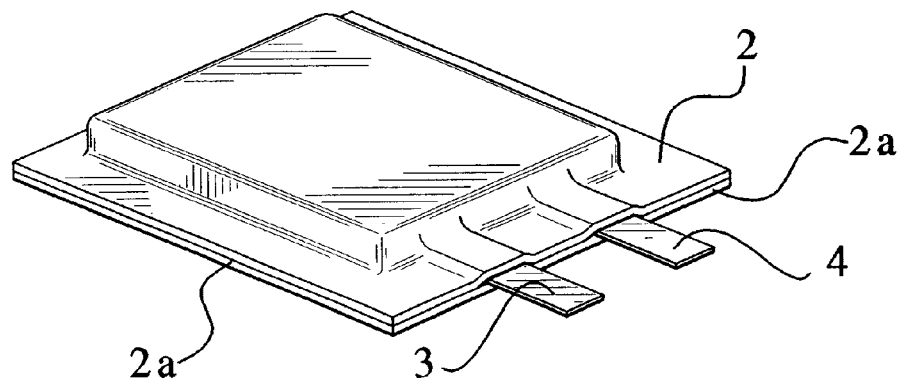
FIG. 2 is a schematic perspective view showing an example of the structure of the nonaqueous-electrolyte secondary battery according to the present invention.

The nonaqueous-electrolyte secondary battery according to the present invention is, for example, a solid electrolyte battery or a gel electrolyte battery. As shown in FIGS. 1 and 2, a battery element 1 contains a solid electrolyte or a gel electrolyte placed between an active material layer of a positive electrode and an active material layer of a negative electrode. The battery element 1 is accommodated in a case 2 constituted by laminated films. Then, the peripheral portion of the case 2 is welded with heat so that the battery element 1 is encapsulated.

The battery element 1 is provided with a negative-electrode terminal lead 3 which is electrically connected to the negative electrode, which constitutes the battery element 1, and a positive electrode terminal lead 4 which is electrically connected to the positive electrode. The negative-electrode terminal lead 3 and the positive electrode terminal lead 4 are draw out to the outside portion of the case 2.

The nonaqueous-electrolyte secondary battery according to the present invention has a structure that the negative-electrode terminal lead 3 and the positive electrode terminal lead 4 are held by heat-welded portions of the case 2 and exposed to the outside portion of the case 2 when the battery element 1 is encapsulated by the case 2. At least portions of the negative-electrode terminal lead 3 and the positive electrode terminal lead 4 which are held by the laminated films and arranged to be welded with heat are attempted to realize a satisfactory adhesiveness with the metal which constitutes the terminals and that with the innermost layers of the laminated films. To achieve this, each of the foregoing portions of the negative-electrode terminal lead 3 and the positive electrode terminal lead 4 is coated with an olefine adhesive layer containing a titanate coupling material and resin which is the same as resin which forms the innermost layer of the laminated film.

Figure 3:
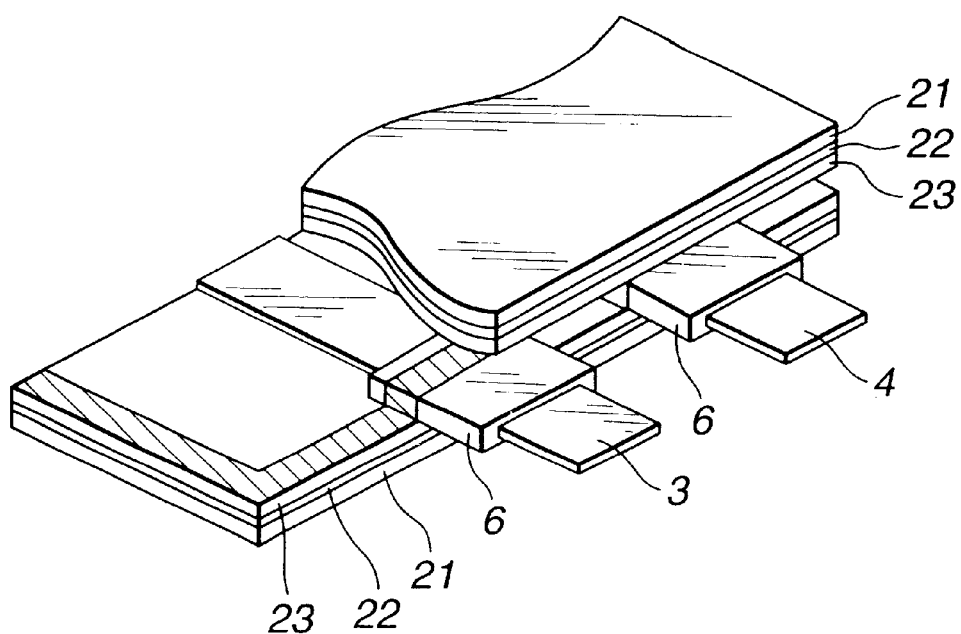
FIG. 3 is a partially-broken schematic and perspective view showing a heat-welded portion of a case.

The foregoing structure is shown in FIG. 3. The case 2 is constituted by three layers consisting of, for example, a case protective layer 21, an aluminum layer 22 and a heat-welded layer (the innermost layer of the laminate) 23. The peripheral portion of the case 2 is welded with heat so that the inside portion of the case 2 is sealed. Therefore, the peripheral portions of the case 2 each having a predetermined width serve as heat-welded portions 2a. The heat-welded layers 23 in the heat-welded portion 2a are welded to each other with heat.

Therefore, the negative-electrode terminal lead 3 and the positive electrode terminal lead 4 traverse the heat-welded portions 2a. Thus, the negative-electrode terminal lead 3 and the positive electrode terminal lead 4 are drawn out to the outside portion of the case 2.

Figure 4:
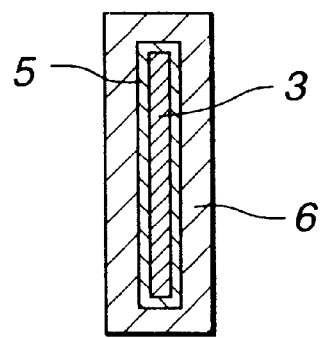
FIG. 4 is a cross sectional view showing a lead of a terminal of a negative electrode.

In the present invention, portions of the negative-electrode terminal lead 3 and the positive electrode terminal lead 4 corresponding to the heat-welded portions 2a are coated with an olefine adhesive layer 5 and a coating layer 6. FIG. 4 shows an example of the structure for coating the negative-electrode terminal lead 3. The negative-electrode terminal lead 3 is first coated with the olefine adhesive layer 5. Then, the olefine adhesive layer 5 is coated with the coating layer 6 made of resin which is the same as resin for forming the innermost layer (the heat-welded layer 23) of the laminated film which constitutes the case 2.

The olefine resin for forming the olefine adhesive layer 5 may be any one of a variety of olefine resin materials, such as polyethylene, polypropylene, denatured polyethylene or denatured polypropylene, having a commercial moisture-proofing grade. As an alternative to this, adhesive polyolefine resin may be employed which is represented by "BONDYNE" which is trade name of Sumitomo Chemical and "POLYTACK" which is trade name of Idemitsu Petrochemistry. Note that a mixture of two or more types of the foregoing materials may be employed. The employed material is diluted in solvent, such as toluene, so that solution is prepared. Then, the surfaces of the leads of the terminals of the electrodes are coated with the foregoing solution by using a brush or a dispenser. Then, the wet portions are heated so as to be dried so that the olefine adhesive layer 5 is formed.

Then, a titanate coupling material exemplified later is mixed in an adequate quantity with the olefine adhesive layer 5. Thus, satisfactory adhesiveness with the metal constituting the terminals and that with the resin which constitutes the innermost layer of the laminated film can furthermore reliably be obtained without any deterioration in the moistureproofing characteristic.

The titanate coupling material is exemplified by tetraalkoxy titanium compounds expressed by general formula $Ti(OR)_4$ (where R is carbon hydride), such as diisopropoxy bis (ethylacetoacetate) titanium, tetraisopropoxytitanium, tetra-n-butoxytitanium, tetrakis (2-ethylhexyloxy) titanium, tetrastearyloxytitanium and tetramethoxytitanium or an acylate compound obtainable from reactions between the foregoing compound and carboxylic acid anhydride.

Also any one of the following materials may be employed: titanium xylate compounds expressed by general formula $(HOYO)_2Ti(OR)_2$ or $(H_2NYO)_2Ti(OR)_2$ (where each of Y and R is carbon hydride), such as diisopropoxybis (acetylacelonate) titanium, isopropoxy (2-ethyl-1, 3-hexanediorate) titanium, direction (2-ethylhexoxy) bis (2-ethyl-1, 3-hexanediorate) titanium, di-n-butoxybis (triethanolaminate) titanium, tetraacetylacetate titanium, hydroxybis (lactate) and titanium.

As an alternative to this, a titanate coupling material composed of a titanium compound or an alcoxypolytitanylacylate compound selected from a group consisting of the following materials may be employed: isopropyl triisostealoyl titanate, isopropyltri-n-dodecylbenzenesulfonyl titanate, isopropyltris (dioctylpyrophosphate) titanate, tetraisopropylbis (dioctylphosphite) titanate, tetraoctylbis (ditridecylphosphite) titanate, tetra (2, 2-diaryloxymethyl-1-butyl) bis (ditridecyl) phosphite titanate, bis (dioctylpyrophosphate) oxyacetate titanate, bis (dioctylpyrophosphate) ethylene titanate, isopropyltrioctanoyl titanate, isopropyldimethacryloylisostealoyl titanium, isopropylisostealoyldiacryl titanate, isopropyltri (dioctylphosphate) titanate, isopropyltricumylphenyl titanate and isopropyltri (N-aminoethyl, aminoethyl) titanate.

The foregoing material may be employed solely or mixture of the foregoing materials may be employed.

One of the foregoing materials may be employed or a mixture of two or more materials may be mixed with each other so as to be blended into the olefine adhesive layer 5.

The coating layer 6 used to coat the olefine adhesive layer 5 is made of the resin which is the same as the resin which forms the innermost layer of the laminated film. Any one of a variety of the following olefine resin materials each having the commercial moistureproofing grade may be employed: polyethylene, polypropylene, denatured polyethylene and denatured polypropylene. As the bonding method, a film made of the foregoing olefine resin may be used, followed by contact-bonding the olefine resin film or by welding the same with heat. As an alternative to this, an insert molding method or the like may be employed.

The electrode terminal leads (the negative-electrode terminal lead 3 and the positive electrode terminal lead 4) are connected to the corresponding positive and negative electrodes. It is preferable that the material of the positive electrode terminal lead 4 is aluminum, titanium or their mixture from a viewpoint of realizing a high potential and a characteristic free from dissolution. It is preferable that the negative-electrode terminal lead 3 may be made of copper, nickel or their alloy.

Since the negative-electrode terminal lead 3 made of nickel or the like some times raises a problem of unsatisfactory adhesiveness, the olefine adhesive layer 5 and the coating layer 6 may be provided for only the negative-electrode terminal lead 3.

The innermost layer of the laminated film must have resistance against the electrolytic solution and penetration of moisture. To meet the foregoing requirements, it is preferable that polyethylene, polypropylene or a denatured material of polyethylene or polypropylene is employed. The foregoing resin, however, suffers from poor adhesiveness with metal forming the terminals of the electrodes. To simply improve the adhesiveness with metal, it might be feasible to employ resin denatured with acrylic acid or maleic acid or resin having the polarity raised by an ionomer process. If the polarity is raised by the foregoing method, also affinity with water is undesirably enhanced. In the foregoing case, only initial adhesiveness is realized. As the time elapses, water is introduced greatly as compared with the denatured material, causing the adhesiveness to deteriorate. As a result, water in a large quantity undesirably penetrates. Therefore, it is inadvisable to provide the foregoing olefine resin having the improved polarity for the innermost layer of the resin provided for the leads of the terminals of the electrode or the laminated film to obtain the adhesiveness with metal which constitutes the terminals of the electrodes.

In the present invention, the olefine adhesive layer 5 is formed on metal which constitutes the leads of the terminals of the electrode, the olefine adhesive layer 5 containing the titanate coupling material mixed in a proper quantity and having improved adhesiveness with metal without deterioration of the moistureproofing characteristic. Therefore, a satisfactory state of adhesion can be realized between metal constituting the leads of the terminals of the electrodes and the olefine resin provided for the innermost layer of titanate laminated film such that penetration of water can significantly be prevented.

Moreover, the olefine adhesive layer 5 is made of the resin (the coating layer 6) which is the same as the resin which constitutes the innermost layer of the laminated film.

Therefore, the problem that the olefine adhesive agent absorbs moisture before use of the nonaqueous-electrolyte secondary battery can be prevented. Hence it follows that strong adhesion with the resin constituting the innermost layer of the laminated film and having the polarity, which has not been improved, can be realized by using heat.

The olefine adhesive agent has a structure that the olefine resin contains the titanate coupling material by 0.3 wt % to 20 wt %, preferably 0.5 wt % to 10 wt %.

If the quantity of the titanate coupling material is 0.3 wt % or smaller, the adhesiveness cannot be improved. If the quantity is 20 wt % or larger, strong coagulation of the titanate coupling material inhibits formation of a strong adhesive layer. To form a strong adhesiveness, it is preferable that the quantity is 0.5 wt % or larger. To realize a uniform material, it is preferable that the quantity is 10 wt % or smaller.

When the thickness of the olefine adhesive layer 5 containing the titanate coupling material is 0.5 $\mu$m or smaller, the adhesiveness cannot be improved. If the thickness is 100 $\mu$m or larger, the mechanical strength required for the adhesive layer cannot be obtained. If the thickness is 1 $\mu$m or smaller, the operation for forming a uniform layer cannot easily be performed. If the thickness is 50 $\mu$m or larger, water in an excessively large quantity penetrates the olefine adhesive layer 5.

The thickness of the coating layer 6, which is formed on the olefine adhesive layer 5 containing the titanate coupling material and which is made of the resin which is the same as the resin which constitutes the innermost layer of the laminated film, is not less than 1 $\mu$m nor more than 100 $\mu$m, preferably not less than 5 $\mu$m nor more than 50 $\mu$m. If the thickness is 1 $\mu$m or smaller, the effect of protecting the olefine adhesive layer 5 from moisture required before use cannot be realized. If the thickness is 100 $\mu$m or larger, an excessively large quantity of water penetrates the coating layer 6.

As a simple and reliable method of forming the coating layer 6 on the olefine adhesive layer 5, the heat welding method may be employed. If the thickness of the coating layer 6 is 5 $\mu$m or smaller, the thickness is undesirably changed to about 1 $\mu$m during the welding process. Therefore, it is preferable that the thickness of the coating layer 6 is 5 $\mu$m or larger. The coating layer 6 is an intermediate layer between the olefine adhesive layer 5 and the innermost layer of the laminated film. Therefore, an excessively large thickness is not required. To prevent a loss of electricity and heat which are used during the heat welding process, it is preferable that the thickness is 50 $\mu$m or smaller.

When the battery element 1 is a solid electrolyte battery or a gel electrolyte battery, a polymer material for preparing the solid polymer electrolyte may be any one of the following materials: silicon gel, acrylic gel, acrylonitrile gel, polyphosphagen denatured polymer, polyethylene oxide, polypropylene oxide, their composite polymer, crosslinked polymer, denatured polymer, fluorine polymer, for example, poly (vinylidene fluoride), poly (vinylidene fluoride-co-hexafluoropolypropylene), poly (vinylidenefluoride-co-tetrafluoroethylene) and poly (vlnylidenefluoride-c-trifluoroethylene). Also a mixed material of the foregoing materials may be employed. As a matter of course, the polymer material is not limited to the foregoing, material.

A method of obtaining the solid electrolyte or the gel electrolyte laminated on the positive-electrode active material layer or the negative-electrode active material layer will now be described. Solution is prepared which is composed of a polymer compound, salt of electrolyte and solvent (and a plasticizer in a case of the gel electrolyte). Then, positive-electrode active material layer or the negative-electrode active material layer is impregnated with the foregoing solution. Then, the solvent is removed so that a solid electrolyte is obtained. The positive-electrode active material layer or the negative-electrode active material layer is impregnated with a portion of the solid electrolyte laminated on the positive-electrode active material layer or the negative-electrode active material layer so that the foregoing electrolyte is solidified. When the crosslinking type material is employed, light or heat is used to realize crosslinking so that a solid material is obtained.

The gel electrolyte is composed of the plasticizer containing lithium salt and a matrix polymer in a quantity not less than 2 wt % nor more than 30 wt %. To obtain the gel electrolyte, ester, ether or carbonic ester may solely be employed or as one of the components of the plasticizer.

The matrix polymer for gelling the carbonic ester in the process for preparing the gel electrolyte may be any one of polymers for use to constitute the gel electrolyte. From a viewpoint of stability of oxidation and reduction, it is preferable that fluorine polymer, for example, poly (vinylidenefluororide) or poly (vinylidenefluoride-co-hexafluoropolypropylene), is employed.

The lithium salt which is contained in the gel electrolyte or the polymer solid electrolyte may be lithium salt for use in a usual electrolytic solution of a battery. The lithium compound (salt) is exemplified by the following materials. Note that the present invention is not limited to the following materials.

The lithium compound (salt) is exemplified by: lithium chloride, lithium bromide, lithium iodide, lithium chlorate, lithium perchlorate, lithium bromate, lithium iodate, lithium nitrate, lithium tetrafluoroborate, lithium hexafluorophosphate, lithium acetate, bis (trifluoromethanesulfonyl) imidolithium, $LiAsF_6$, $LiCF_3SO_3$, $LiC(SO_2CF_3)_3$, $LiAlCl_4$ or $LiSiF_6$.

The foregoing lithium compound may be employed solely or a plurality of the lithium compounds may be mixed. It is preferable that $LiPF_6$ or $LiBF_4$ is employed from a viewpoint of stability of oxidation and reduction.

The lithium salt is dissolved at a concentration of 0.1 mol to 3.0 mol in the plasticizer in a case of the gel electrolyte, preferably 0.5 mol/litter to 2.0 mol/litter.

The battery according to the present invention can be constituted by a method similar to a method for constituting a conventional lithium ion battery except for the structure of the present invention in which the foregoing gel electrolyte or the solid electrolyte containing the foregoing carbonic ester is employed.

The material of the negative electrode of the lithium ion battery may be a material which is able to dope/dedope lithium. The foregoing material of the negative electrode may be a carbon material, such as non-graphitizing carbon or a graphite material. Specifically, any one of the following carbon materials may be employed: pyrocarbon; cokes (pitch cokes, needle cokes or petroleum cokes); graphite; vitreous carbon, a sintered compact of an organic polymer compound (a material obtained by sintering phenol resin or faran resin at a proper temperature so as to be carbonized); carbon fiber and active carbon. As an alternative to this, the material which is able to dope/dedope lithium may be a polymer material, such as polyacetylene or polypyrrole, or oxide, such as $SnO_2$. When the negative electrode is manufactured from any one of the foregoing materials, a known binder and the like may be added.

The positive electrode may be manufactured by using metal oxide, metal sulfide or a specific polymer to correspond to the type of the required battery. When the lithium ion battery is manufactured, the active material of the positive electrode may be any one of the following materials: metal sulfide or oxide which does not contain lithium, for example, $TiS_2$, $MoS_2$, $NbSe_2$ or $V_2O_5$; or composite lithium oxide mainly composed of $LiMO_2$ (where M is one or more types of transition metal and x which varies depending on the state of charge/discharge of the battery is usually not less than 0.05 nor more than 1.10). It is preferable that the transition metal M which constitutes the composite lithium oxide is Co, Ni, Mn or the like. The composite lithium oxide is exemplified by $LiCoO_2$, $LiNiO_2$, $LiNi_yCo_{1-y}O_2$ (where 0<y<1) and $LiMn_2, O_4$. The foregoing composite lithium oxide is an active material for the positive electrode which is capable of generating high voltage and which exhibits a satisfactory energy density. Plural types of the foregoing active materials may be contained in the positive electrode. When the active material is employed to manufacture the positive electrode, a known conductive material and a binder may be added.

EXAMPLES

Examples and comparative examples of the present invention will now be described on the basis of results of experiments.

Manufacture of Sample Batteries

Initially, the negative electrode was manufactured as follows.

Ninety parts by weight of powder of graphite and 10 parts by weight of poly (vinylidenefluoride-co-hexafluoropropylene) serving as the binder were mixed with each other so that a mix for the negative electrode was prepared. Then, the mix for the negative electrode was dispersed in N-methyl-2-pyrolidone so that slurry was obtained. The slurry was uniformly applied to either side of elongated copper foil which was a collector for the negative electrode and which had a thickness of 10 $\mu$m. Then, wet slurry was dried, and then a compression molding process was performed by operating a roll pressing machine. Thus, the negative electrode was manufactured.

On the other hand, the positive electrode was manufactured as follows.

To obtain a positive-electrode active material ($LiCoO_2$), lithium carbonate and cobalt carbonate were mixed with each other at a ratio of 0.5 mol:1 mol. Then, the mixture was baked in air at 900° C. for 5 hours. Then, 91 parts by weight of obtained $LiCoO_2$, 6 parts by weight of graphite serving as a conducting material and 10 parts by weight of poly (vinylidenefluoride-co-hexafloropolypropylene) were mixed with one another so that a mix for the positive electrode was prepared. Then, the mix for the positive electrode was dispersed in N-methyl-2-pyrolidone so that slurry was obtained. The slurry was uniformly applied to elongated aluminum foil which was a collector of the positive electrode and which had a thickness of 20 $\mu$m. Then, wet slurry was dried, and then a compression molding process was performed by operating a roll pressing machine. Thus, the positive electrode was manufactured.

The gel electrolyte was obtained as follows.

Each of the negative electrode and the positive electrode was uniformly coated with solution and impregnated with the same which was obtained as follows: 10 parts by weight of poly (vinylidenefluoride-co-hexafluoropolypropylene) having a weight average molecular weight Mw which was 600,000 and 60 parts by weight of diethyl carbonate were mixed and dissolved in 30 parts by weight of a plasticizer composed of 42.5 parts by weight of ethylene carbonate (EC), 42.5 parts by weight of polypropylene carbonate (PC) and 15 parts by weight of $LiPF_6$. Then, the negative electrode and the positive electrode were allowed to stand at room temperatures for 8 hours. Then, dimethyl carbonate was vaporized and removed so that a gel electrolyte was obtained.

The negative electrode and the positive electrode which were coated with the gel electrolyte were pressed against each other such that the gel electrolyte portions faced each other. As a result, a flat gel electrolyte battery having a size 2.5 cm×4.0 cm and a thickness of 0.3 mm was manufactured.

A lead of the terminal of the positive electrode made of aluminum and a lead of the terminal of the negative electrode made of nickel were welded to portions of the electrodes on each of which the active material layer was not applied (the aluminum foil portion of the positive electrode and the copper foil portion of the negative electrode). Then, the battery element was inserted into an encapsulating medium constituted by the laminated film. Then, the laminated film was welded with heat under conditions of 200° C. and 10 seconds such that the width of sealing was 5 mm. Thus, test batteries were manufactured.

EXAMPLES AND COMPARATIVE EXAMPLES

As shown in Table 1, the composition of the material, the quantity of the contained titanate coupling material, the thickness of the adhesive layer on the lead of the terminal, the thickness of the olefine resin (the coating layer) applied to the adhesive layer and the terminal subjected to the process were varied to manufacture sample batteries by the above-mentioned method of manufacturing the test battery.

When only either of the positive electrode or the negative electrode was subjected to the process, the adhesive agent was not applied to the other electrode. Similarly to the innermost layer of the laminated film, only the resin film was previously welded with heat.

TABLE 1

| | Composition of Material | Quantity of Contained Coupling Material (wt %) | Thickness of Adhesive Layer on Lead of Terminal (μm) | Thickness of Olefine Resin Applied to Adhesive Layer (μm) | Terminal Subjected to Process |
|---|---|---|---|---|---|
| Example 1 | A-a | 3 | 15 | 15 | only Al for positive electrode |
| Example 2 | | | | | only Ni for negative electrode |
| Example 3 | | | | | both of positive and negative electrodes |
| Example 4 | A-b | 7 | 3 | 30 | only Al for positive electrode |
| Example 5 | | | | | only Ni for negative electrode |
| Example 6 | | | | | both of positive and negative electrodes |
| Example 7 | A-c | 5 | 10 | 20 | only Al for positive electrode |
| Example 8 | | | | | only Ni for negative electrode |
| Example 9 | | | | | both of positive and negative electrodes |
| Example 10 | B-a | 5 | 10 | 15 | only Al for positive electrode |
| Example 11 | | | | | only Ni for negative electrode |
| Example 12 | | | | | both of positive and negative electrodes |
| Example 13 | B-b | 8 | 10 | 20 | only Al for positive electrode |
| Example 14 | | | | | only Ni for negative electrode |
| Example 15 | | | | | both of positive and negative electrodes |
| Example 16 | B-c | 4 | 15 | 20 | only Al for positive electrode |
| Example 17 | | | | | only Ni for negative electrode |
| Example 18 | | | | | |
| Example 19 | C-a | 4 | 15 | | |
| Example 20 | | | | | |
| Example 21 | | | | | |
| Example 22 | C-b | 7 | 7 | | |
| Example 23 | | | | | |
| Example 24 | | | | | |
| Example 25 | C-c | 2 | 10 | | |
| Example 26 | | | | | |
| Example 27 | | | | | |
| Comparative Example 1 | A-a | 3 | 15 | | |
| Comparative Example 2 | | | | | |
| Comparative Example 3 | A-b | 7 | 0.3 | | |
| Comparative Example 4 | | | 120 | | |
| Comparative Example 5 | | | 0.7 | | |
| Comparative Example 6 | A-c | 0.1 | 10 | | |
| Comparative Example 7 | | 0.4 | | | |
| Comparative Example 8 | | | 12 | | |
| Comparative Example 9 | D-d | | | | |
| Comparative Example 10 | E-e | | | | |
| Comparative Example 11 | F-f | | | | |

TABLE 1-continued

| | | |
|---|---|---|
| Example 18 | | both of positive and negative electrodes |
| Example 19 | 20 | only Al for positive electrode |
| Example 20 | | only Ni for negative electrode |
| Example 21 | | both of positive and negative electrodes |
| Example 22 | 30 | only Al for positive electrode |
| Example 23 | | only Ni for negative electrode |
| Example 24 | | both of positive and negative electrodes |
| Example 25 | 15 | only Al for positive electrode |
| Example 26 | | only Ni for negative electrode |
| Example 27 | | both of positive and negative electrodes |
| Comparative Example 1 | 150 | both of positive and negative electrodes |
| Comparative Example 2 | 1 | |
| Comparative Example 3 | 30 | both of positive and negative electrodes |
| Comparative Example 4 | | |
| Comparative Example 5 | | |
| Comparative Example 6 | 20 | both of positive and negative electrodes |
| Comparative Example 7 | | |
| Comparative Example 8 | | |
| Comparative Example 9 | 100 | both of positive and negative electrodes |
| Comparative Example 10 | | |
| Comparative Example 11 | | |

The resin for use to form the innermost layer of the laminated film in Table was as follows.

A: CPP (cast polypropylene)

B: PE (polyethylene) denatured CPP

C: LLDPE (straight-chain low-density polyethylene)

D: LLDEP denatured with maleic acid

E: CPP denatured with maleic acid

F: PE denatured with acrylic acid

The composition of the adhesive layer formed on the lead of the terminal of the electrode was as follows:

a: A mixed mate rial composed of 20 wt % EPR (ethylenepropylene rubber), 40 wt % toluene and 40 wt % xylene was mixed and dissolved at 60° C., followed by adding diisopropoxybis (ethylacetoacetate) titanium was added in such a manner that the composition shown in Table 1 was realized. After application, the applied solution was dried at 150° C. for one hour.

b: A mixed material composed of 20 wt % of CPP denatured with PE, 10 wt % of decalin and 70 wt % of toluene was mixed and dissolved at 40° C., followed by adding tetraisopropoxy titanium was added in such a manner that the composition shown in Table 1 was realized. After application, the applied solution was dried at 150° C. for one hour.

c: A mixed material composed of 10 wt % of EPR, 10 wt % of CPP denatured with PE, 10 wt % of decalin and 70 wt % of toluene was mixed and dissolved at 40° C., followed by adding tetra-n-butoxy titanium was added in such a manner that the composition shown in Table 1 was realized. After application, the applied solution was dried at 150° C. for one hour.

d: Films made of LLCEP denatured with maleic acid and each having a thickness of 100 µm were welded to the upper and lower surfaces of the electrode such that the films faced each other.

e: Films made of CPP denatured with maleic acid and each having a thickness of 100 µm were welded to the upper and lower surfaces of the electrode such that the films faced each other.

f: Films made of PE denatured with acrylic acid and each having a thickness of 100 µm were welded to the upper and lower surfaces of the electrode such that the films faced each other.

Evaluation

The test batteries according to Examples 1 to 27 and Comparative Examples 1 to 11 were introduced into a thermo-hygrostat tank set to 70° C. and relative humidity of 90%. After a lapse of 720 hours, the concentration of water was measured by the Karl Fischer's method.

The test batteries according to Examples 1 to 27 and Comparative Examples 1 to 11 were introduced into a thermo-hygrostat tank set to 40° C. and 65% which was the relative humidity to perform charge/discharge cycle tests at 2-hour discharge (½C) of theoretical capacity such that the charge and discharge were performed 500 times. Thus, retention ratios of the discharge capacities were measured.

Results were shown in Table 2.

TABLE 2

| | Concentration of Water (ppm) | Discharge Capacity Retention Ratio (%) |
|---|---|---|
| Example 1 | 3 | 90 |
| Example 2 | 3 | 90 |
| Example 3 | 2 | 93 |
| Example 4 | 5 | 90 |
| Example 5 | 3 | 90 |
| Example 6 | 1 | 95 |
| Example 7 | 4 | 89 |
| Example 8 | 3 | 91 |
| Example 9 | 2 | 97 |
| Example 10 | 5 | 90 |
| Example 11 | 3 | 90 |
| Example 12 | 1 | 96 |
| Example 13 | 3 | 91 |
| Example 14 | 3 | 91 |
| Example 15 | 1 | 96 |
| Example 16 | 2 | 91 |
| Example 17 | 4 | 90 |
| Example 18 | 2 | 93 |
| Example 19 | 3 | 92 |
| Example 20 | 2 | 92 |
| Example 21 | 1 | 95 |
| Example 22 | 4 | 90 |
| Example 23 | 2 | 91 |
| Example 24 | 1 | 96 |
| Example 25 | 3 | 90 |
| Example 26 | 2 | 91 |
| Example 27 | 1 | 95 |
| Comparative Example 1 | 12 | 70 |
| Comparative Example 2 | 7 | 78 |
| Comparative Example 3 | 9 | 75 |
| Comparative Example 4 | 9 | 77 |
| Comparative Example 5 | 8 | 75 |

TABLE 2-continued

|  | Concentration of Water (ppm) | Discharge Capacity Retention Ratio (%) |
|---|---|---|
| Comparative Example 6 | 9 | 80 |
| Comparative Example 7 | 7 | 78 |
| Comparative Example 8 | 7 | 77 |
| Comparative Example 9 | 15 | 68 |
| Comparative Example 10 | 15 | 70 |
| Comparative Example 11 | 97 | 30 |

As can be understood from Table 2, Examples 1 to 27 structured such that the adhesiveness of the leads of the terminals of the electrodes were improved without dependency on the improvement in the polarity of the olefine resin and the adhesive layer and the olefine resin layer formed on the adhesive layer were caused to have optimum thicknesses such that excessive enlargement of the thicknesses were prevented were able to satisfactory prevent introduction of water. Therefore, satisfactory cycle resistance characteristics were confirmed. Comparative Examples 1 to 8 were resulted in unsatisfactory moistureproofing characteristics as compared with the examples because the thicknesses of the layers were not optimized and the quantity of the coupling agent was not set properly. Comparative Examples 9 to 11 resulted in furthermore unsatisfactory results because of the moisture absorption of the employed resin.

As can be understood from the foregoing description, the present invention is able to maintain the adhesiveness of the leads of the terminals of the electrode in the heat-welded portions with the case without deterioration in the moisture-proofing characteristics. As a result, a nonaqueous-electrolyte secondary battery exhibiting excellent moisture-proofing characteristics and a long lifetime against charge/discharge cycles can be provided.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A nonaqueous-electrolyte secondary battery comprising:
    a case constituted by laminated films;
    a battery element accommodated in said case and encapsulated in said case by heat welding; and
    leads of terminals of electrodes electrically connected with said electrodes which are exposed to the outside portion of said case such that said leads are surrounded by heat-welded portions, wherein
    a portion of at least either of said leads of said terminals of said electrodes corresponding to said heat-welded portion is coated with an olefine adhesive layer containing a titanate coupling material and a coating layer made of resin which is the same resin which forms the innermost layer of each of said laminated films.

2. The nonaqueous-electrolyte secondary battery according to claim 1, wherein said lead of said terminal of said electrode coated with said oleline adhesive layer containing said titanate coupling material and said coating layer made of the resin which is the same as the resin which forms the innermost layer of said laminated films is a lead of a terminal of an electrode for a negative electrode.

3. The nonaqueous-electrolyte secondary battery according to claim 2, wherein said lead of said terminal of said electrode for said negative electrode is made of nickel.

4. The nonaqueous-electrolyte secondary battery according to claim 1 wherein the quantity of said titanate coupling material contained in said olefine adhesive layer is 0.3 wt % to 20 wt %.

5. The nonaqueous-electrolyte secondary battery according to claim 1, wherein the thickness of said olefine adhesive layer is 0.5 $\mu$m to 100 $\mu$m.

6. The nonaqueous-electrolyte secondary battery according to claim 1, wherein the thickness of said coating layer is 1 $\mu$m to 100 $\mu$m.

7. The nonaqueous-electrolyte secondary battery according to claim 1, wherein an electrolyte which constitutes said battery element is a gel electrolyte or a solid electrolyte containing matrix polymer and lithium salt.

8. The nonaqueous-electrolyte secondary battery according to claim 7, wherein said matrix polymer is polyvinylidenefluoride and/or copolymer of vinylidenefluoride and hexafluoropropylene.

9. The nonaqueous-electrolyte secondary battery according to claim 1, wherein at least one of said electrodes which constitute said battery element is a negative electrode containing a material which is capable of doping/dedoping lithium.

10. The nonaqueous-electrolyte secondary battery according to claim 9, wherein said material which is capable of doping/dedoping lithium is a carbon material.

11. The nonaqueous-electrolyte secondary battery according to claim 1, wherein at least one of said electrodes which constitute said battery element is a positive electrode containing a composite oxide of lithium and transition metal.

* * * * *